(12) United States Patent
Johansson et al.

(10) Patent No.: US 11,405,319 B2
(45) Date of Patent: Aug. 2, 2022

(54) TOOL PORT THROTTLING AT A NETWORK VISIBILITY NODE

(71) Applicant: Gigamon Inc., Santa Clara, CA (US)

(72) Inventors: Jan Johansson, Palo Alto, CA (US); Tushar R. Jagtap, Cupertino, CA (US); Vikram Reddy, Fremont, CA (US); Ujjvala Nangineni, Los Altos, CA (US)

(73) Assignee: Gigamon Inc., Santa Clara, CA (US)

( * ) Notice: Subject to any disclaimer, the term of this patent is extended or adjusted under 35 U.S.C. 154(b) by 0 days.

(21) Appl. No.: 15/806,767

(22) Filed: Nov. 8, 2017

(65) Prior Publication Data

US 2019/0140957 A1 May 9, 2019

(51) Int. Cl.
*H04L 47/127* (2022.01)
*H04L 47/74* (2022.01)

(52) U.S. Cl.
CPC .......... *H04L 47/127* (2013.01); *H04L 47/741* (2013.01)

(58) Field of Classification Search
CPC .............................. H04L 47/127; H04L 47/741
See application file for complete search history.

(56) References Cited

U.S. PATENT DOCUMENTS

| | | | | |
|---|---|---|---|---|
| 10,581,728 B1* | 3/2020 | Zipperer | ................. | H04L 47/29 |
| 2008/0279207 A1* | 11/2008 | Jones | ...................... | H04L 47/20 370/412 |
| 2009/0285220 A1* | 11/2009 | Shaffer | ............... | H04L 12/1822 370/395.42 |
| 2010/0002635 A1* | 1/2010 | Eklund | .................... | H04L 47/70 370/329 |
| 2012/0047273 A1* | 2/2012 | Ajero | ................... | H04L 12/2801 709/228 |
| 2012/0092988 A1* | 4/2012 | Zhou | ...................... | H04L 47/127 370/230 |
| 2013/0265886 A1* | 10/2013 | Leong | ...................... | H04L 43/10 370/250 |
| 2014/0016474 A1* | 1/2014 | Beheshti-Zavareh | ........................ | H04L 47/283 370/236 |
| 2014/0254357 A1* | 9/2014 | Agarwal | ................. | H04L 47/12 370/229 |
| 2014/0307624 A1* | 10/2014 | Kim | ................. | H04N 21/26241 370/328 |
| 2015/0092591 A1* | 4/2015 | Matthews | ............. | H04L 43/062 370/253 |
| 2015/0281085 A1* | 10/2015 | Phaal | ...................... | H04L 47/12 370/235 |
| 2016/0135079 A1* | 5/2016 | Synnergren | ........... | H04W 28/10 370/230 |

(Continued)

*Primary Examiner* — Un C Cho
*Assistant Examiner* — Yu-Wen Chang
(74) *Attorney, Agent, or Firm* — Perkins Coie LLP

(57) ABSTRACT

Systems and methods are disclosed for analyzing traffic received at a network visibility node to determine traffic levels relative to capacity at tools communicatively coupled to the network visibility node and throttling traffic when the traffic levels exceed tool capacity. In an illustrative embodiment, streams received at a network visibility node are analyzed to predict a traffic level for a given traffic flow. The predicted level of traffic for a given traffic flow is used to decide whether to forward traffic associated with the given traffic flow to a tool port of the network visibility node that is communicatively coupled to an external tool.

15 Claims, 9 Drawing Sheets

(56) References Cited

U.S. PATENT DOCUMENTS

2017/0048144 A1\* 2/2017 Liu ...................... H04L 47/122
2017/0099224 A1\* 4/2017 O'Connor ............. H04L 47/125
2017/0244607 A1\* 8/2017 Dujodwala ............. H04L 12/42
2017/0359261 A1\* 12/2017 Avci ..................... H04L 47/125

\* cited by examiner

TOOL PORT THROTTLING AT A NETWORK VISIBILITY NODE

TECHNICAL FIELD

The present disclosure generally relates to network traffic visibility technology.

BACKGROUND

With ever-increasing amounts of data traffic on modern computer networks, network monitoring and security measures play an increasingly important role in reducing the vulnerability of a network to intrusion, unauthorized access and other security or performance issues. Tools can be deployed in a computer network that process the network traffic and provide monitoring and security services. Examples of network monitoring tools include an intrusion detection system (IDS), an intrusion prevention system (IPS), a sniffer, a network monitoring system, an application monitoring system, an intrusion detection system, a forensic storage system, and an application security system, among others.

Tools deployed in a network environment are only as effective as the network traffic that they can see. Existing approaches to network traffic visibility involve deploying multiple editions of the same tool across a computer network to increase visibility into the network traffic. Alternatively, one or more network visibility nodes can be communicatively coupled between communicating nodes on a computer network. In an in-line deployment, packets originating from a source node on a computer network are routed through a tool before continuing on to the intended destination node. In contrast, in an out-of-band deployment, copies of packets originating from one node are made and routed to the tool, while the original packets are forwarded on the network for transmission to the intended receiving node.

BRIEF DESCRIPTION OF THE DRAWINGS

The present disclosure is illustrated by way of example, and not by way of limitation, in the figures of the accompanying drawings and in which like reference numerals refer to similar elements. The figures of the accompanying drawings depict only example embodiments of the present disclosure and are therefore not to be construed as limiting. In the drawings.

DETAILED DESCRIPTION

Overview

Figure 1:
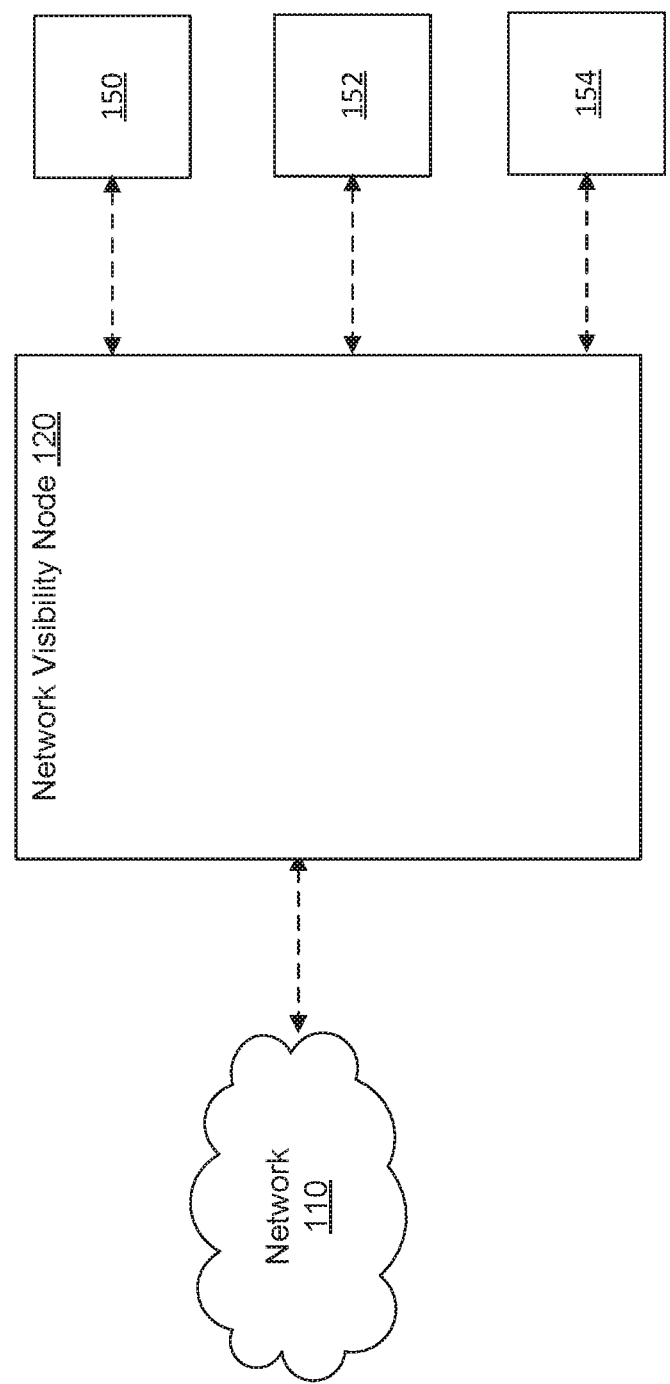
FIG. 1 shows an example system including a network visibility node communicatively coupled to a computer network.

FIG. 1 shows an example system including a network visibility node 120 communicatively coupled to a computer network 110. The network visibility node 120 may be one of multiple network visibility nodes deployed as part of a visibility fabric. A visibility fabric may include one or more physical and/or virtual devices that tap into a given network (e.g., network 110) to receive traffic and forward to various tools for processing. For example, the network visibility node 120 depicted in FIG. 1 can route traffic communicated over a network such as network 110 to the one or more centralized in-line and/or out-of-band tools 150, 152, and 154 for processing.

As network traffic is forwarded by the network visibility node 120, a tool 150, 152 or 154 may become overloaded if the volume of traffic forwarded to it exceeds available processing resources at the tool. Even if traffic over the network 110 is not directly affected (e.g., in an out-of-band deployment), the interruption caused by overloading at a tool can still have negative effects. For example, overloading at a network monitoring tool may lead to the dropping of packets at the tool, thereby leading to invalid or incomplete monitoring data.

The network visibility node 120 can be configured to limit traffic forwarded to the tools, for example, by imposing a percentage-based sampling regime. For example, the network visibility node 120 can be configured to forward only 60% of relevant traffic to a given external tool 150, 152, 154 to prevent overloading the tool. Although effective to an extent, a percentage-based sampling regime may not be ideal because it can lead to underutilization of the tools.

To address the above mentioned challenges, a technique is introduced herein for maximizing tool utilization while preventing overloading. Specifically, a technique is introduced for tool port throttling that involves selective admission of traffic via a tool port of the visibility node 120 based on the capacity of the tool port and a predicted level of the traffic. As will be described in greater detail later, this selective admission of traffic can be performed on a per-session basis. In such embodiments, a level of traffic (e.g., in the form of a packet rate) for a session stream can be predicted based on a characteristic of the stream as indicated by a packet associated with the stream. Based on the predicted level of traffic, the session stream can then be either admitted for forwarding to a tool via a tool port or denied forwarding.

Example Network Visibility Node

Figure 2A:
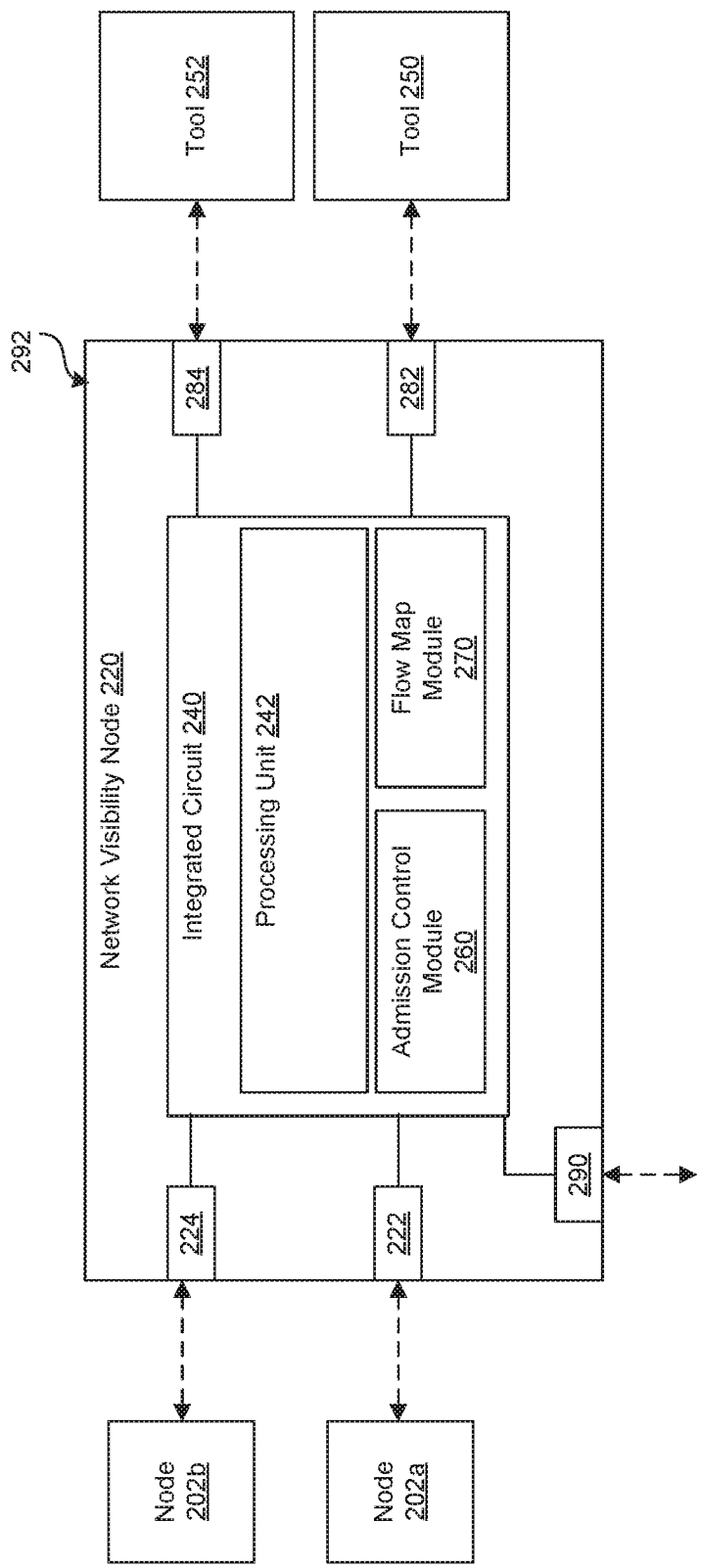
FIG. 2A shows an example network visibility node.

FIG. 2A shows an example network visibility node 220. The example network visibility node 220 may be similar to the network visibility node 120 depicted in FIG. 1. It will be appreciated that the network visibility node 220 depicted in FIG. 2A is an example provided for illustrative purposes. The example network visibility node 220 includes a housing 292, one or more network ports 222, 224, and one or more tool ports 282, 284. As used herein, the term "network port" may refer to any port of the network visibility node 220 configured to be communicatively coupled to a network (e.g., network 110). The term "tool port" may refer to any port of the network visibility node 220 that is configured to communicatively coupled to an external tool (e.g., tool 250, 252).

The network visibility node 220 also includes one or more integrated circuits 240 which in some embodiments may include one or more processing units 242. Note the network visibility node 220 with a housing 292 is depicted in FIG. 2A as physical device. However, in other embodiments a network visibility node with similar functionality to network visibility node 220 may be implemented at least partially in software (i.e., virtualized) within a physical device or distributed across multiple physical devices.

The network visibility node 220 also includes an admission control module 260 and flow map module 270, which along with processing unit(s) 242 may perform one or more of the operations described herein. The admission control module 260 and flow map module 270 are depicted separate from the processing unit 242, but may, in some embodiments, be integrated. Further, the processing unit 242, admission control module 260, and flow map module 270 are depicted in FIG. 2A as part of the integrated circuit 240, but may in some embodiments comprise separate components. For example, the admission control module 260 may include a set of instructions stored in a memory unit (not shown) that is communicatively coupled to the integrated circuit 240. In the illustrated embodiments, the network visibility node 220 may also include other components, such as a physical layer network chip ("Network PHY") (not shown) coupled to each of the respective ports 222, 224 and 282, 284, wherein the Network PHYs may be considered to be parts of the integrated circuit 240. Alternatively, the Network PHYs may be considered to be components that are separate from the integrated circuit 240. The PHY is configured to connect a link layer device to a physical medium such as an optical fiber, copper cable, etc. In other embodiments, instead of the PHY, the network visibility node 220 may include an optical transceiver, or a SERDES, etc. The housing 292 allows the network visibility node 220 to be carried, transported, sold, and/or operated as a single unit. The ports 222, 224 and 282, 284 are located at a periphery of the housing 292. In other embodiments, the ports 222, 224 and 282, 284 may be located at other locations relative to the housing 292. Although two network ports 222 and 224 are shown, in other embodiments, the network visibility node 220 may include fewer or more than two network ports. Also, although two tool ports 282 and 284 are shown, in other embodiments, the network visibility node 220 may include fewer or more than two tool ports. The tool ports 282, 284 may be configured to communicate with one or more tools 250, 252, for example for network monitoring. Tools 250, 252 may be the same or similar to tools 150, 152, 154 described with respect to FIG. 1. The one or more tools 250, 252 may include one or more network tools. In other cases, the one or more tools 250, 252 may be one or more non-transitory media, such as one or more storage devices, one or more databases, etc. In some embodiments, the one or more tools 250, 252 may represent physical and/or virtual devices.

In an embodiment, during use, a first network port 222 of the network visibility node 220 is communicatively coupled (e.g., via a network 110) to a first node 202*a*, and a second network port 224 is communicatively coupled (e.g., via the network 110) to a second node 202*b*. The term "node" in this context may refer to any entity (e.g., a device, application, user, etc.) communicating over the network. Communication may be over a combination of private and public networks (e.g., the Internet). In some embodiments, the network visibility node 220 is configured to receive packets from nodes 202*a-b* via the network ports 222, 224. Packets received from nodes 202*a-b* can be processed according to the techniques described herein at the processing unit 242 of network visibility node 220 and/or forwarded on to one or more external tools 250, 252 via the tool ports 282, 284 for processing. In an in-line configuration, the received packets are then forwarded to the destination node (e.g., node 202*a* or 202*b*) after processing (e.g., at network visibility node 220 and/or the one or more external tools 250, 252).

As previously described, tool ports 282, 284 of the network visibility node 220 may be communicatively coupled to the respective tools 250, 252. The tools 250, 252 may be directly coupled to the network visibility node 220 or communicatively coupled to the network visibility node 220 through a network (e.g., network 110). In some cases, the network visibility node 220 is provided as a single unit that allows the network visibility node 220 to be deployed at a single point along a communication path. In the illustrated embodiments, the network visibility node 220 (e.g., the integrated circuit 240) is configured to receive packets from nodes 202*a-b* via the network ports 222, 224 and process the packets in accordance with a predefined scheme.

In some embodiments, one or more of the network ports 222, 224 may be configured to receive normal packets (e.g., packets not from a virtualized network), as well as virtualized packets (e.g., packets with tunnel format that includes an encapsulation of the original packets resulting from virtualization technology). In other embodiments, one or more of the network ports 222, 224 may be configured to receive only non-virtualized packets. In further embodiments, one or more of the network ports 222, 224 may be configured to receive only virtualized packets.

The integrated circuit 240 may be or include any switch module that provides packet transmission in accordance with a particular transmission scheme. The integrated circuit 240 may be user-configurable such that packets may be transmitted in a one-to-one configuration (i.e., from one network port to a tool port). A tool (e.g., tools 250, 252) may be or may be part of a non-pass through device (i.e., it can only receive packets intended to be communicated between two nodes, and cannot transmit such packets downstream), such as a sniffer, a network monitoring system, an application monitoring system, an intrusion detection system, a forensic storage system, an application security system, or a database. The tool may also be or be part of a pass-through device (i.e., it can receive packets, and transmit the packets back to the network visibility node 220 after the packets have been processed), such as an intrusion prevention system. In other embodiments, the integrated circuit 240 may be configured such that the packets may be transmitted in a one-to-many configuration (i.e., from one network port to multiple tool ports). In other embodiments, the integrated circuit 240 may be configured such that the packets may be transmitted in a many-to-many configuration (i.e., from multiple network ports to multiple tool ports). In further embodiments, the integrated circuit 240 may be configured such that the packets may be transmitted in a many-to-one configuration (i.e., from multiple network ports to one tool port). In some embodiments, the one-to-one, one-to-many, many-to-many, and many-to-one configurations are all available for allowing a user to selectively configure the network visibility node 220 so that the packets (or certain types of packets) are routed according to any one of these configurations.

Tool ports can be logically grouped into load balanced tool port groups that include two or more tool ports. For example, in a one-to-one configuration, a packet received at a particular network port may be forwarded to one of the tool ports (e.g., the least utilized tool port) in a particular load balanced tool port group.

In some embodiments, the packet movement configuration is predetermined such that when the network visibility node 220 receives the packets, the network visibility node 220 will automatically forward the packets to the tool ports based on the predetermined packet movement configuration (e.g., one-to-one, one-to-many, many-to-many, and many-to-one) without the need to analyze the packets (e.g., without the need to examine the header, determine the type of packets, etc.).

In accordance with some embodiments, the integrated circuit 240 may have the functionalities of a conventional packet switch except that it provides visibility into various parts of a network. Thus, embodiments of the integrated circuit 240 may operate like a conventional managed packet switch, but provide packet monitoring functionality. This is accomplished by configuring the integrated circuit 240 to operate as a circuit switch under certain circumstances. In some embodiments, the configuring of the managed packet switch may be performed by utilizing a CPU interface of the switch to modify appropriate registers in the switch to allow for the desired operation. Also, in some embodiments, the integrated circuit 240 may be an "out-of-band" network switch, which is configured to obtain packets and pass them to a tool or to a network that is different from that associated with the original intended destination of the packets.

Also, the term "out-of-band" device/switch refers to a device that is not involved in a transmission of a packet from a first node to an intended recipient node. In some cases, a device may be both an in-band device and an out-of-band device with respect to processing different packets. For example, the network visibility node 220 may be an in-band device if it receives a packet (intended for transmission from node 1 to node 2) from a network, and passes the packet back to the network (e.g., after the packet has been processed by a pass-through network tool) for transmission downstream to the node 2. The same network visibility node 220 may also be an out-of-band device if it receives another packet from the network, and does not pass the packet back to the network for transmission to the intended receiving node.

It should be noted that the integrated circuit 240 that may be used with the network visibility node 220 is not limited to the examples described above, and that other integrated circuits 240 with different configurations may be used as well. Also, in one or more embodiments described herein, the integrated circuit 240 may be implemented using a processor (e.g., a general purpose processor, a network processor, an application-specific integrated circuit (ASIC) processor, a field-programmable gate array (FPGA) processor, etc.).

In other embodiments, the network visibility node 220 may optionally include an additional processing unit (e.g., a processor) communicatively coupled to the processing unit 242. The additional processing unit may be used to perform additional packet processing, such as header stripping, in some embodiments. For example, in some embodiments, the additional processing unit may be configured to receive only packets with a tunnel format, such as that used in a virtualized network. In one implementation, the processing unit 242 or the integrated circuit 240 is configured to pass all packets with a tunnel format to the additional processing unit, and does not pass packets without any tunnel format (e.g., packets that are not associated with a virtualized network) to the additional processing unit. Upon receiving a packet with a tunnel format, the additional processing unit then removes one or more headers from the packet. By means of non-limiting examples, the additional processing unit may be configured to remove an outer MAC header, an outer IP header, an outer UDP header, or any combination of the foregoing, from the packet. In some embodiments, after the additional processing unit performs header stripping on the packet, the additional processing unit then passes the packet back to the integrated circuit 240. The integrated circuit 240 then forwards the packet to one or more of the tool ports 282, 284 according to a pre-determined or user-defined transmission scheme (e.g., one-to-one, one-to-many, many-to-one, many-to-many, etc.) as discussed previously. In other embodiments, in addition to performing packet stripping, the additional processing unit may also be configured to perform other packet processing functions on the received packet. The additional processing unit may be located outside the housing of the network visibility node 220 or may be a part of the integrated circuit 240. For example, the additional processing unit may be considered to be a part of the processing unit 242. Also, in some embodiments, the additional processing unit may be a general purpose processor, a network processor, an ASIC processor, a FPGA processor, or any of other types of processor. In other embodiments, the additional processing unit may be any hardware, software, or combination thereof.

In the illustrated embodiments, the processing unit 242 is illustrated as a component of the integrated circuit 240. In some cases, the processing unit 242 may be one or more processors in the integrated circuit 240. In other cases, the processing unit 242 may be one or more circuit components that are parts of the integrated circuit 240. In other embodiments, the processing unit 242 may be a separate component from the integrated circuit 240. The processing unit 242 may be implemented using a processor, such as a general processor, a network processor, an ASIC processor, a FPGA processor, etc. In other embodiments, the processing unit 242 may be a field processor. In further embodiments, the processing unit 242 may be a network card. The processing unit 242 may be implemented using one or more processors, wherein one or more of the processors may be considered to be a part of the network visibility node 220 or not. Also, in some embodiments, the integrated circuit 240 may include ternary content-addressable memory (TCAM). The integrated circuit 240 may be configured to perform various packet processing functions, included but not limited to packet filtering, packet routing, packet switching, packet mirroring, packet aggregation, etc.

As shown in the figure, the network visibility node 220 further includes one or more I/O port(s) 290 for importing and exporting data. For example, in an embodiment port 290 may include a configuration port for receiving configuration information to thereby configure any of integrated circuit 240, processing unit 242, admission control module 260, or flow map module 270. For example, in an embodiment, data is received at port 290 for configuring a switching fabric associated with integrated circuit 240, processing unit 242, and/or flow map module 270 according to a user-configured transmission scheme.

In some embodiments, I/O port(s) 290 may be a separate and different port from the other network ports 222, 224 and tool ports 282, 284. In other embodiments, the port 290 may be a network port, like the network ports 222, 224 or may be implemented using one or both of the network ports. In such cases, in addition to receiving configuration information and exporting generated outputs, the port 290 may also receive network traffic that is being communicated between nodes (e.g., nodes 202a-b). Also, in further embodiments, the network visibility node 220 may include multiple I/O ports 290 for transmitting and receiving information.

Figure 2B:
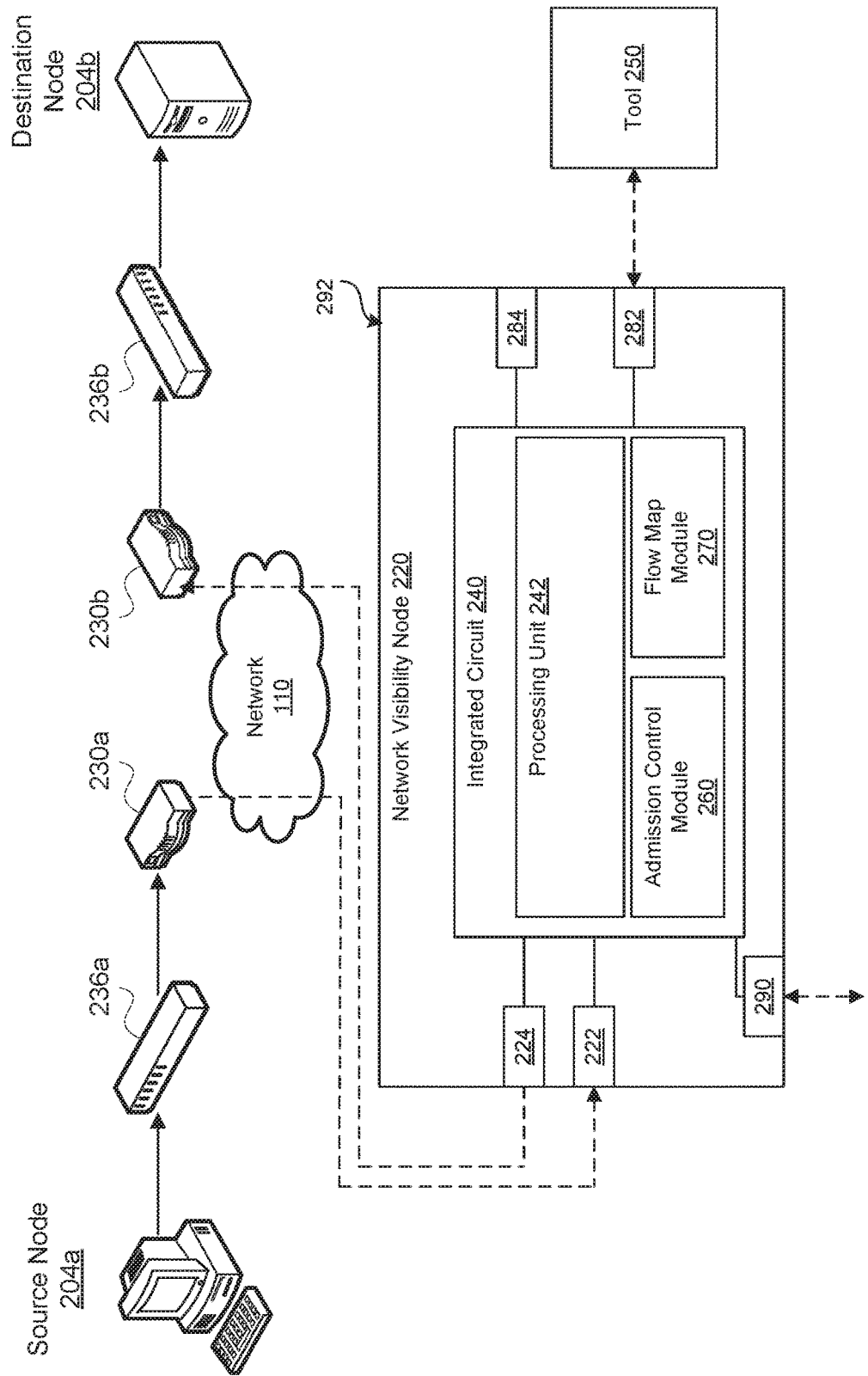
FIG. 2B shows an example in-line configuration of the network visibility node of FIG. 2A.

The network visibility node 220 can be configured to enable visibility into the traffic transmitted across a network (e.g., network 110). Visibility can be enabled by "tapping"

network traffic to and from nodes communicating over the network. In other words, the network visibility node 220 can be configured to tap packets being transmitted from a source node to a destination node over the network. For example, FIG. 2B, shows an example in-line configuration of a network visibility node 220 (e.g., similar to described with respect to FIG. 2A) illustrating an example route of a packet transmitted over a network (e.g., network 110) from a source node 204a (e.g., a first computing device) to a destination node 204b (e.g., a second computing device). Along the example route, a packet may pass through (i.e., be routed, forwarded, etc.) multiple other nodes (e.g., switches 236a-b and routers 230a-b). In the example route depicted in FIG. 2B, both the network visibility node 220 and the tool 250 are deployed in-line with the packet route (i.e., within the flow of network traffic). For example, the packet originates at source node 204a and is destined for destination node 204b. In the example of FIG. 2B, the packet is tapped at or at some point after router 230a and received at network port 222 of the network visibility node.

The term "tapping" in this context may generally refer to the routing or copying of packets (that are intended for delivery to a destination node 204b) to a network visibility node 220. In an out-of-band configuration this may include copying the packet along its transmission route and transmitting the copied packet to network visibility node 220 without otherwise impacting the "original" packet's route over network 110. In an in-line configuration (as illustrated) this may include re-directing the packet to the network visibility node 220 before returning the packet to the network 110 for transmission to the designated destination node 204b. In either case, the means for tapping the network traffic can include for example, a physical or virtual tap device that is communicatively coupled to the network (e.g., network 110) and is configured to copy and/or redirect packet traffic. In some cases, a node (e.g., switch 236a or router 230a may include port mirroring capabilities. For example any of nodes 236a-b, or routers 230a-b may include a SPAN (switch port analyzer) port configured to copy packets seen on a particular port (or an entire VLAN) via a SPAN port, where the packet can be analyzed.

After reception at network port 222, the packet may be processed at processing unit 242 (e.g., in conjunction with the admission control module 260) and/or forwarded to an external tool 250 via a tool port 282. If the packet is forwarded to the tool port 282 (e.g., according to a user-configurable transmission scheme implemented by the switching fabric of integrated circuit 240), the packet continues to tool 250 for processing. After processing the packet returns to the network visibility node (e.g., via tool port 282 or another tool port) where it is then forwarded to network port 224 (e.g., according to a user-configurable transmission scheme implemented by the switching fabric of integrated circuit 240) where it is then transmitted to the destination node 204b (e.g., via nodes 230b and 236b). If after receipt at network port 222 and processing at unit 242, the packet is not forwarded to an external tool, the packet may be directly forwarded to network port 224 (e.g., according to a user-configurable transmission scheme implemented by the switching fabric of integrated circuit 240) where it is then transmitted to the destination node 204b (e.g. via nodes 230b and 236b).

Figure 2C:
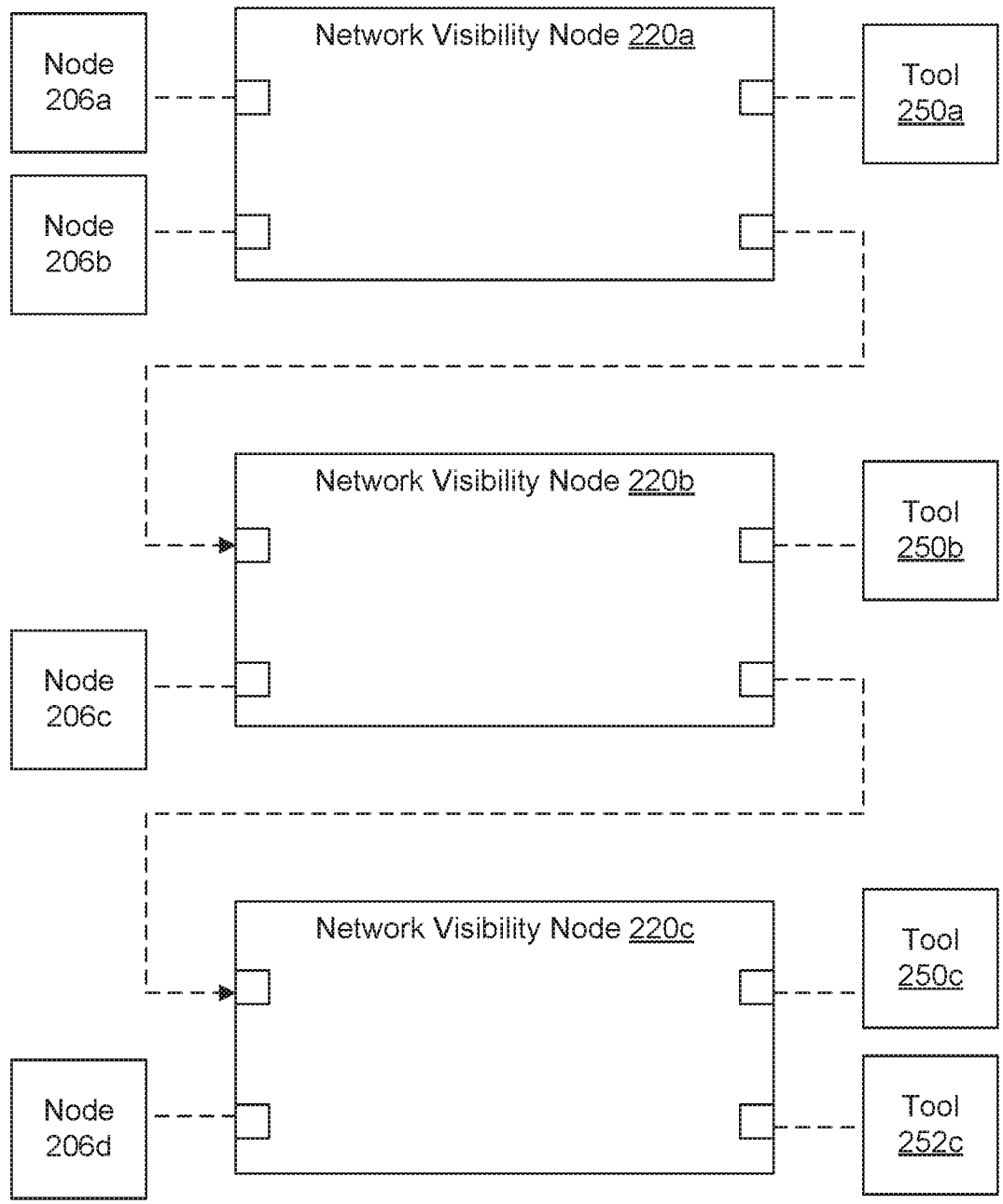
FIG. 2C shows a diagram of an example arrangement of multiple stacked network visibility nodes.

In some embodiments, the technique described herein may be performed by a plurality of network visibility nodes 220 that are stacked together. Also, in some embodiments, any of the above features that are described as being performed by a single network visibility node 220 may alternatively be performed by a single network visibility nodes 220 that are stacked together. Similarly, in some embodiments, any of the above features that are described as being performed by the processing unit 242 may alternatively be performed by a plurality of processing units 242 at the respective network visibility nodes 220 that are stacked together. FIG. 2C illustrates an example of a stacked configuration in which multiple network visibility nodes 220a-c are stacked together. In the example configuration depicted in FIG. 2C, a first network visibility node 220a is communicatively coupled to a tool 250a, and nodes 206a and 206b. The first network visibility node 220a is also communicatively coupled to a second network visibility node 220b. The second network visibility node 220b is communicatively coupled to tool 250b and node 206c, and to a third network visibility node 220c. The third network visibility node 220c is communicatively coupled to tools 250c, 252c and to node 206d. The stacked configuration depicted in FIG. 2C is only an example provided to illustrate that multiple visibility node entities (physical and/or virtual) can be communicatively coupled to each other to provide visibility into a given network. In some embodiments, the system of multiple network visibility nodes 220a-c depicted in FIG. 2C may be collectively considered components in a singular network visibility node or may be collectively considered a visibility fabric comprising multiple network visibility nodes. In such an arrangement, certain aspects of the disclosed technique may be distributed across the multiple network visibility nodes 220a-c (e.g., multiple physical devices or hosts) using clustering. Traffic associate with a particular flow that is received at each of the one or more network visibility nodes 220a-c may be aggregated at a particular node (e.g., one of the network visibility nodes 220a-c) before being sent to one of the tools 250a-c or 252c. Such a case may require synchronization signaling between the multiple network visibility nodes 220a-c.

For illustrative clarity certain processes associated with the disclosed technique shall be described herein as being performed by the network visibility node 220. Similarly, the network visibility node 220 may be described as being configured to perform the described processes. This shall not be construed as limiting. In some embodiments, certain described processes or individual steps of described processes may be specifically performed by any one or more of the aforementioned subcomponents of the example network visibility node 220. For example, in some embodiments, the described processes or individual steps of described processes may be performed by the integrated circuit 240, the processing unit 242, the admission control module 260, the flow map module 270, or any combination thereof. Further, in some embodiments, the described processes or individual steps of described processes may be performed by another processing unit associated with or in communication with the network visibility node 220.

Tool Port Throttling

Figure 3:
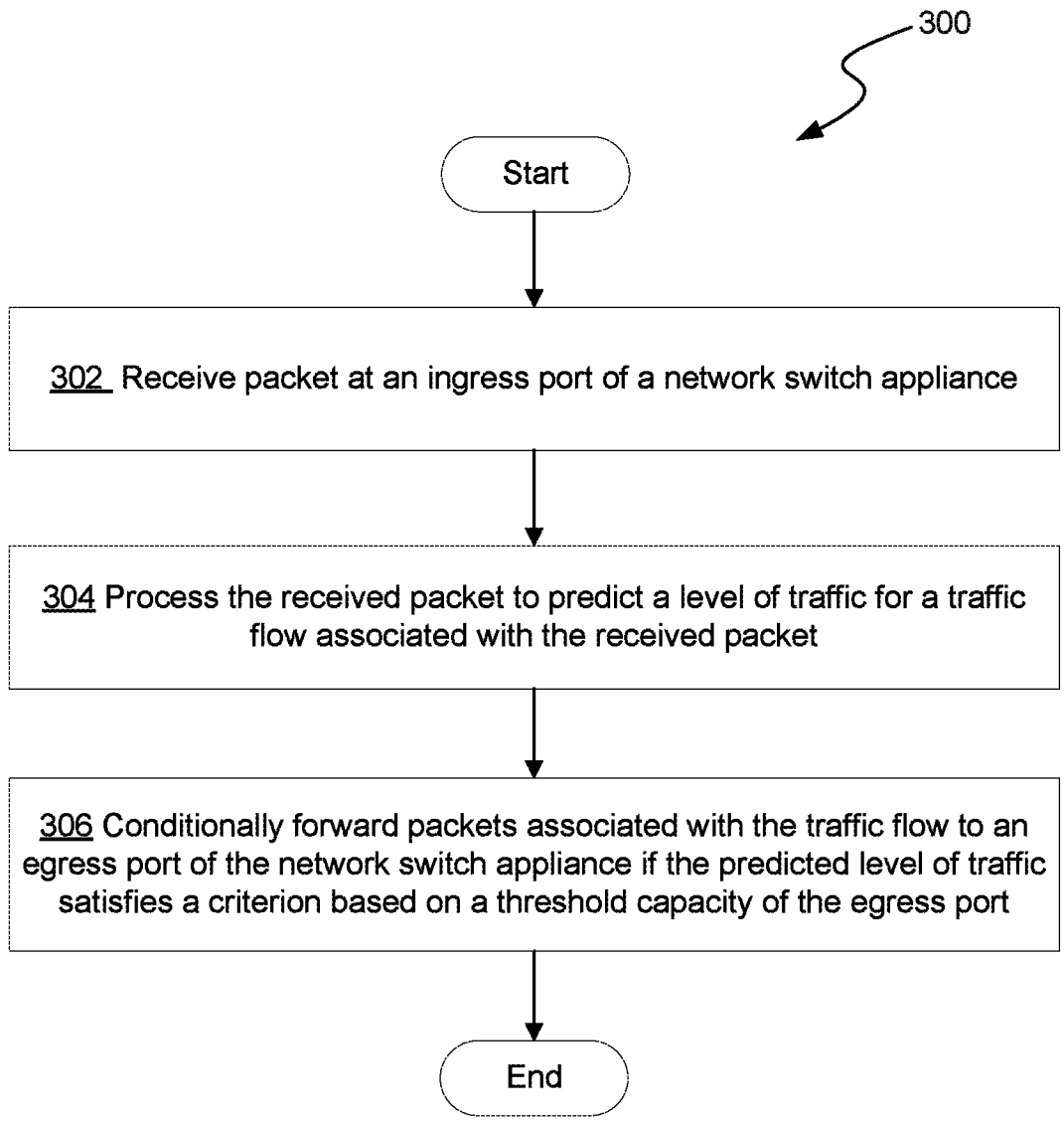
FIG. 3 shows a flow diagram describing an example tool port throttling process.

FIG. 3 shows a flow diagram illustrating an example tool port throttling process 300. Specifically, the flow chart depicted in FIG. 3 describes an example process for deciding, based on a received packet, whether to forward an associated traffic flow to a tool port for transmission to an external tool. For clarity, the example process 300 is described with respect to network visibility node 220 and associated components depicted in FIG. 2A, however this is not to be construed as limiting. The process may be applied by any type of processing device (physical or virtual) that includes a point of ingress communicatively coupled to a network and a point of egress communicatively coupled to an external tool. Further, one or more steps of the example process 300 may be performed by any one or more of the components of the example processing system described with respect to FIG. 7. For example, the process depicted in FIG. 3 may be represented in instructions stored in memory that are then executed by a processing unit. The process 300 described with respect to FIG. 3 is an example provided for illustrative purposes and is not to be construed as limiting. Other processes may include more or fewer steps than depicted while remaining within the scope of the present disclosure. Further, the steps depicted in example process 300 may be performed in a different order than is shown.

Example process 300 begins at step 302 with receiving a packet at an ingress port of a network visibility node. Specifically, with reference to FIG. 2A, step 302 may involve receiving a packet at a network port 222, 224 of a network visibility node 220. Again, the packet received at the network port 222, 224 of the network visibility node 220 may be or be a copy of a tapped packet that has been transmitted over a computer network (e.g., network 110) from a source node (e.g., node 202a) to a destination node (e.g., node 202b). As will be described later, the received packet may be an initial packet (e.g., a control packet) associated with a forthcoming stream of data packets. For example, the received packet may be a control packet based on a control protocol such as the Session Initiation Protocol (SIP) and associated Session Description Protocol (SDP). In such an embodiment, the packet may include an SIP INVITE message indicative of a new communications session that will include a forthcoming stream of packets (e.g., a real-time transport protocol (RTP) stream) transmitted over the computer network. The SIP invite may include information in SDP indicative of certain characteristics of the RTP stream including a code to be applied. In some embodiments, the SIP message may be part of a dialog between end-point nodes to set a codec to applied for the one or more RTP streams. In such as case, process 300 may rely on receiving multiple packets including SIP messages to resolve a codec selected during the code selection process. Although SIP is used as an example, a person having ordinary skill in the art will recognize that the technique can be applied to other protocols as well. For example, in some embodiments, the received packet is associated with a General Radio Packet Service (GPRS) Tunneling Protocol (GTP). In such an embodiment the received packet may be a control packet including a GTP-C signaling message with information indicative of a characteristic (e.g., an applied codec) of the a stream of GTP-U data packets that will follow. In some embodiments, the act of receiving the packet at step 302 may be performed by any of the ingress port (e.g., a network port 222, 224), the integrated circuit 240, the processing unit 242, the admission control module 260, the flow map module 270, or any other component (shown or not shown) of the network visibility node 220.

Next, the network visibility node 220, processes the received packet to predict a level of traffic for a traffic flow associated with the received packet. In other words, the network visibility node 220 uses the received packet to predict a level of traffic (that is in some way associated with the received packet) that will be received at one or more points in the future. In some embodiments, the act of processing the packet at step 304 is performed by the admission control module 260. This step may similarly be performed by any of the other components of network visibility node 220 such as the ingress port (e.g., a network port 222, 224), the integrated circuit 240, the processing unit 242, the flow map module 270, or any other component (shown or not shown) of the network visibility node 220.

A "traffic flow" in this context generally refers to any set of related network traffic that is received by the network visibility node 220 for forwarding to one or more external tools 250, 252. In some embodiments, a "traffic flow" may include a stream of packets, for example, associated with a communications session. In a specific embodiment, the "traffic flow" includes any packets associated with a particular session.

A "level of traffic" in this context generally refers to any type of measure or metric associated with the received traffic. In some embodiments, the predicted "level of traffic" may include any one or more of a predicted packet rate (e.g., in packets per second), a data rate (e.g., in bits per second), a packet volume (e.g., in total packets), a data volume (e.g., in total bits), any statistical aggregate thereof (e.g., a minimum, maximum, average, or median packet rate), etc.

The process of predicting a level of traffic may be performed using different techniques. In some embodiments, the received packet is analyzed to determine some characteristics of the received packet, and/or by extension, an associated traffic flow. This process of analyzing the packet may involve analyzing exposed information in a header of the received packet. Alternatively, or in addition, the process of analyzing the received packet may include a deep packet inspection (DPI) process to analyze payload data. This may involve one or more sub-processes to strip headers from the received packet to inspect payload contents.

Figure 4:
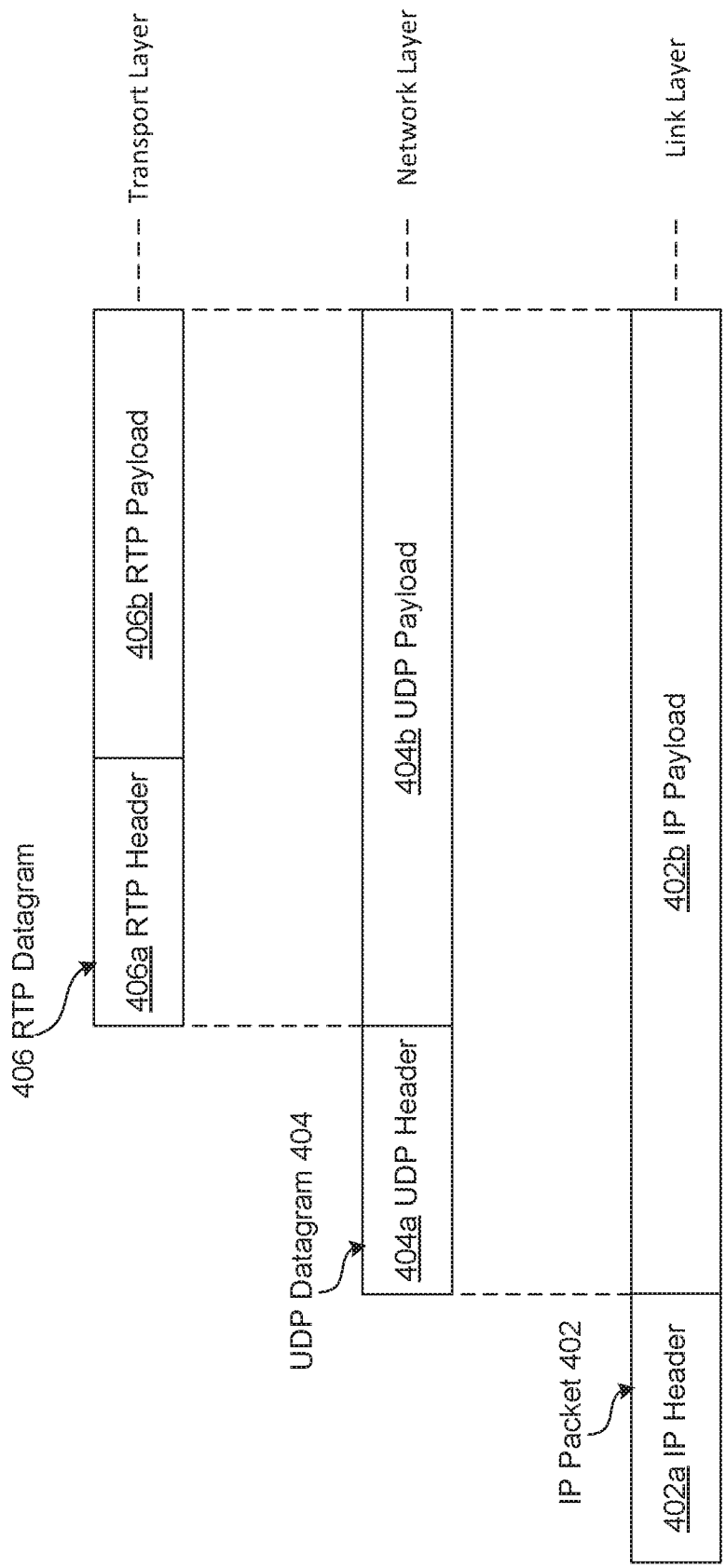
FIG. 4 shows a diagram of an example data encapsulation scheme for a data packet.

FIG. 4 shows a conceptual diagram of a data encapsulation scheme for an example packet. The example encapsulation scheme depicted in FIG. 4 is provided for illustrative purposes and is not to be construed as limiting. As shown in FIG. 4, a link layer packet (e.g., an IP packet 402) may include an IP header 402a. The IP header 402a may include information associated with the IP packet 402 such as IP version information, source IP address, destination IP address, a traffic class indicator, a time to live or hop limit value, a payload length, etc. The IP packet 402 also includes an IP payload 402b. This IP payload 402b may itself comprise a network layer datagram (e.g., a UDP or TCP datagram). In the example illustrated in FIG. 4, the IP payload 402b includes a user datagram protocol (UDP) datagram 404 that may be associated with an audio and/or video transmission that favors low-latency at the expense of guaranteed delivery. The example UDP datagram 404 includes a UDP header 404a that includes information associated with the UDP datagram 404 such as a UDP version identifier, a UDP payload length, a UDP checksum, a source port number, a destination port number, etc. Note that the "port number" mentioned in the context of a transport layer header does not necessarily refer to the aforementioned ports (e.g., network ports and tool ports) of a network visibility node 220. The UDP datagram 404 further includes UDP payload data 404b. This UDP payload 404b may itself comprise a transport layer datagram. In the example illustrated in FIG. 4, the UDP payload 404b includes an RTP datagram 406 that may be associated with a real-time audio and/or video transmission. The example RTP datagram 406 includes an RTP header 406a that includes information associated with the RTP datagram 406 such as an RTP version identifier, a sequence identifier, a synchronization identifier, a timestamp, etc. The RTP datagram 406 also includes RTP payload data 406b. The RTP payload data 406b may include the underlying data being transferred between nodes over the network. For example, the RTP payload data 406b may include audio and/or video data that has been encoded using one or more codecs. Example audio codecs include FLAC, AAC, MPEG audio, ITU standard codecs such as G.711, etc. Example video codecs include H.264, WMV, VP9, MPEG video, etc. The payload data 406b accordingly may include some type of codec information that is indicative of the one or more codecs applied to the underlying data (e.g., audio and/or video data). Again, the data encapsulation scheme depicted in FIG. 4 is for an example packet and is not to be construed as limiting. Network traffic may include other types of data and may be organized differently than as shown in FIG. 4.

As previously mentioned, the step 304 may include determining some characteristic of the received packet, and/or by extension, an associated traffic flow. A "characteristic" in this context may include a type of traffic, a transmission protocol associated with the traffic, a codec associated with the traffic, a source of the traffic, a destination of the traffic, or any combination thereof. This characteristic may be inferred, for example, by analyzing information in the received traffic. As an illustrative example, a received packet may be determined to be associated with an audio transmission because the received packet includes a UDP datagram (e.g., UDP datagram 404) as opposed to a TCP datagram. Alternatively, or in addition, a characteristic may be expressly indicated by some information in a received packet. For example, an RTP datagram 406 may include some type of identifier in the RTP payload 406b that indicates a type of codec used for the payload data.

In some embodiments, a "characteristic" of the traffic may be based on factors external to the received packet. For example, a prediction of the level of traffic may be based on a date and/or time when the packet was received at the network visibility node 202. For example, based on historical traffic patterns, a packet received at a particular time may indicate that a stream of packets will follow at a particular packet rate.

Predicting a level of traffic for a traffic flow associated with the received traffic based on certain characteristics may be performed using different techniques. For example, as alluded to in the previous paragraph, a particular characteristic may be associated with a particular level of traffic based on historically observed levels for traffic having the same or similar characteristics. In some embodiments, a set of one or more characteristics of a received packet may be input into a function to generate a prediction of a level of traffic for an associated traffic flow. The values set for various characteristics may be weighted accordingly when input into the predictive function to account for relative importance. For example, the codec used for a received packet may be more indicative of a level of traffic for an associated traffic flow than the source or destination address and may therefore be weighted more heavily when generating a prediction. In some embodiments, machine learning (trained and/or untrained) may be applied to improve predictions over time.

In an embodiment, the prediction at step 304 may be based solely on an applied codec. A codec may include specified data rates and/or other specifications from which data rates may be applied. The codec used in the transmission of a particular traffic flow over a network can therefore serve as a highly accurate predictor of a level of traffic for that traffic flow. The following table shows some sample traffic levels (in packets per second) for a few example audio codecs. The listing below is provided for illustrative purposes and is not exhaustive.

TABLE 1

| Codec Information | | | Bandwidth Calculations | | |
|---|---|---|---|---|---|
| Codec (Bit rate) | Sample Size (bytes) | Sample Interval (ms) | Payload Size (bytes) | Payload Size (ms) | Packets Per Second |
| G.711 (64 Kbps) | 80 | 10 | 160 | 20 | 50 |
| G.723.1 (6.3 Kbps) | 24 | 30 | 24 | 30 | 33.3 |
| G.726 (32 Kbps) | 20 | 5 | 80 | 20 | 50 |
| G.728 (16 Kbps) | 10 | 5 | 60 | 30 | 33.3 |
| G.729 (8 Kbps) | 10 | 10 | 20 | 20 | 50 |

Step 304, in accordance with this preferred embodiment, may include processing a received packet to determine a relevant codec, for example, by inspecting the payload of the received packet for an identifier indicative of the type of codec. For example, the payload of the received packet may include an identifier that the packet is associated with traffic that uses the G.711 codec. A level of traffic is then predicted based on the certain specifications of the relevant codec. For example, the admission control module may access a table (e.g., similar to the table shown above) for information regarding the relevant codec. This information may include a predetermined level of traffic (e.g., packet per second) and or other information associated with the codec (e.g., payload size, sample size, sample interval, etc.) from which a level of traffic (e.g., in packets per second) may be derived. Such an embodiment may provide the benefit of introducing only minimal processing of the packets. For example, instead of invoking computationally expensive feedback loops or machine-learning based predictive algorithms, a prediction can be made by extracting or deriving a traffic level value from a table including information associated with the relevant codec.

Example process continues at step 306 with conditionally forwarding subsequently received packets associated with the traffic flow to an egress port of the network visibility node if the predicted level of traffic satisfies a capacity criterion based on capacity threshold of the egress port. In some embodiments, the act of processing the packet at step 304 is performed by the admission control module 260. This step may similarly be performed by any of the other components of network visibility node 220 such as the ingress port (e.g., a network port 222, 224), the integrated circuit 240, the processing unit 242, the flow map module 270, or any other component (shown or not shown) of the network visibility node 220.

The egress port, in this context, may be a tool port 282, 284 of the network visibility node 220, which as previously mentioned, may be communicatively coupled to an external tool 250, 252. In other words, traffic transmitted to a given tool can be effectively throttled by the network visibility node 220 by conditionally forwarding traffic to the tool ports 282, 284. As a packet is received, via an ingress port, at step 302, a decision is made whether to forward that packet (and an associated traffic flow that will follow) to a tool port 282, 284 based on the ability of the tool 250, 252 communicatively coupled to the tool port 282, 284 to handle the level of traffic predicted at step 304. As will be described later, in a network visibility node 220 including multiple tool ports 282, 284, step 306 may include first identifying which of the multiple tool ports 282, 284 to base an admission decision on.

The process of determining whether to forward packets associated with a traffic flow to a tool port 282, 284 for transmission to a tool 250, 252 can be performed using different techniques. In some embodiments, the admission control module 260 at the network visibility node 220 may simply forward packets associated with a traffic flow if the predicted level of traffic is within some capacity threshold of a particular tool port 282, 284. Consider, for example, a particular tool port 282, 284 that has a predefined or user-defined capacity threshold of 3000 packets per second. This predefined or user-defined capacity threshold may be based on the capacity of a communicatively coupled tool 250, 252 to process packets. In this scenario, the admission control module 260 may admit packets associated with a particular traffic flow (e.g., session) for forwarding to the particular tool port 282, 284 and for eventual transmission to the external tool 250, 252 if the predicted level of traffic of the traffic flow is at or below 3000 packets per second. While simple in execution, such a technique may not effectively avoid overloading the tool since it does not take into account the current level of traffic passing through the tool port 282, 284 from other traffic flows.

Alternatively, in some embodiments, an admission control module 260 at the network visibility node 220 may actively monitor a level of traffic passing through a particular tool port 282, 284 and conditionally forward packets associated with a traffic flow to the particular tool port 282, 284 if the predicted level of the traffic flow satisfies a capacity criterion of the particular tool port 282, 284. For example, the admission control module 260 may actively measure or receive measurement signals indicative of current levels of traffic at a particular tool port 282, 284 continuously or at regular or irregular intervals. Consider again an example scenario in which a particular tool port 282, 284 has a predefined or user-defined capacity threshold of 3000 packets per second. In this scenario, the admission control module 260 may determine that the predicted level of traffic satisfies the capacity criterion if the sum of the predicted level of traffic for the traffic flow and the measured current level of traffic at the particular tool port 282, 284 are at or below 3000 packets per second. In a similar embodiment, the admission control module 260 may instead actively measure or receive measurement signals indicative of current levels of traffic received at the external tool 250, 252. Again, while effective to an extent, such embodiments may also encounter overloading issues due to fluctuations in measured traffic levels at the tool ports 282, 284 and/or external tools 250, 252. Further, the process of actively measuring traffic levels at the tool port 282, 284 and/or external tool 250, 252 may introduce further expenditure of limited computational resources at the network visibility node 220 and or additional signal traffic over the network.

To address challenges associated with the above described techniques, an admission control module 260 may generate and maintain a ledger of traffic allocations for the one or more tool ports 282, 284 of the network visibility node 220. Recall that admission control decisions may be made on a per traffic flow basis. For example, if the admission control module 260 admits a session for forwarding to a particular tool port 282, 284, any packets received at a network port 222, 224 of the network visibility node 220 will be forwarded to the particular tool port 282, 284 for transmission to an external tool 250, 252. The decision to admit the session may therefore entail an allocation of a portion of the capacity of the tool port 282, 284 to the admitted session. As long as the session remains active a portion of the capacity threshold at a tool port 282, 284 may remain allocated to handing packets associated with the session. This may prevent overloading at a tool port 282, 284 (and by extension a tool 250, 252) while effectively guaranteeing that packets for a given traffic flow (e.g., session) are not dropped in order to prevent the overloading.

The aforementioned ledger of traffic allocations may be maintained in the form of a table showing a cumulative level of traffic allocated at a given tool port 282, 284. Consider again an embodiment in which the predicted level of traffic for a particular session is based on a codec utilized for an RTP stream of packets associated with the session. In such an embodiment, the ledger of traffic allocations may be represented by something similar to the following example table. Note that this example table is provided for illustrative purposes and is not to be construed as limiting. The cumulative allocation of traffic handling capacity at a tool port 282,284 and/or external tool 250, 252 may be tracked using any type of organization of data.

TABLE 2

| Time | Tool Port | Session no. | Predicted Traffic Level (pps) | Cumulative Traffic Level (pps) | Capacity Threshold (pps) | Admission Decision |
|---|---|---|---|---|---|---|
| t0 | 282 | 0 | — | 0 | 3000 | N/A |
| t1 | 282 | 1 | 500 | 500 | 3000 | Yes |
| t2 | 282 | 2 | 1500 | 2000 | 3000 | Yes |
| t3 | 282 | 3 | 800 | 2800 | 3000 | Yes |
| t4 | 282 | 4 | 500 | 3300 | 3000 | No |

Table 2, shown above, describes an example scenario involving a tool port 282 configured with a capacity threshold of 3000 packets per second. Again, this capacity threshold may be predefined for the port or may have been user-configured, for example, based on a capacity of an external tool 250 communicatively coupled to the tool port 282. In the illustrated example, each initiated session 1-4 may include one or more RTP streams that use specific codecs for information transfer. As previously described, the codec used for a particular session may be used to predict a level of traffic (e.g., in packets per second) for that session. An admission control module 260 can then compare the predicted level of traffic for the traffic flow against a cumulative throughput (i.e., cumulative allocation based on previously admitted sessions) for the tool port 282 and decide whether to accept or reject forwarding of packets for the particular session based on the capacity threshold for the tool port 282. In this scenario, the admission control module 260 may determine that the predicted level of traffic for a traffic flow satisfies the capacity criterion for admission if the sum of the predicted level of traffic for the traffic flow and the predicted levels of traffic for any other traffic flows previously allocated to the tool port 282 (i.e., the cumulative traffic level) are or below 3000 packets per second. Note that table 2 is applicable only to a single port 282. In some embodiment, similar tables (or other types of allocation ledgers) may be similarly maintained by an admission control module 260 for each of the other tool ports of a network visibility node.

With reference to the table above, at an initial time t0 no sessions have been initiated and therefore no capacity has been allocated at the tool port 282. At time t1 a first session is initiated, for example, based on a packet including an INVITE received at a network port 222, 224 of the network visibility node 220. Based on codec information associated with the first session (e.g., gathered based on processing the received packet), the admission control module 260 predicts a level of traffic of 500 packets per second for the first session. Since this is the first session imitated for the tool port 282, this predicted level of traffic also represents the cumulative level of traffic. The first session is therefore admitted for forwarding to the tool port 282 because the cumulative traffic level of 500 packets per second is less than the capacity threshold of 3000 packets per second for the tool port 282.

At time t2 a first second session is initiated, for example, based on a second packet including a second INVITE received at a network port 222, 224 of the network visibility node 220. Based on codec information associated with the second session (e.g., gathered based on processing the received second packet), the admission control module 260 predicts a level of traffic of 1500 packets per second for the second session. The cumulative level of traffic for the first and second sessions is therefore 2000 packets per second. Again, this cumulative level of traffic is still less than the capacity threshold (3000 packets per second) of the tool port 282, so the second session is also admitted for forwarding to the tool port 282.

This process is repeated as subsequent sessions are initiated (e.g., based on received INVITE packets. As long as the cumulative traffic level remains at or below the capacity threshold of 3000 packets per second, the subsequent session will also be admitted for forwarding to the tool port 282. Note, however, that at time t4 a fourth initiated session causes the cumulative traffic level to rise over the capacity threshold to 3300 packets per second. Accordingly, in this scenario, the fourth session is denied admission for forwarding to the tool port 282 to prevent overloading of a communicatively coupled external tool 250.

Note that denying admission for forwarding packets associated with a particular session would not necessarily impact the session traffic communicated between nodes over the computer network. Recall that the packets received at a network port 222, 224 of a network visibility node 220 represent packets tapped from the network. In an out-of-band configuration, the received packets may include copies of the packets actually being transmitted between nodes over the network. Denial of admission would therefore not impact the actual communications between nodes over the network. These packets may either be held until capacity at the tool port 282, 284 opens up or they may simply be dropped. In an in-band configuration, packets received at a network port 222, 224 that are denied admission for forwarding to a tool port 282, 284 may instead be either held (e.g., until capacity opens up) or transmitted back onto the network (e.g., via a network port 222, 224) to their intended destination.

The scenario depicted in Table 2 assumes that each of the initiated sessions 1-3 have remained active up to this point. However, if any of the sessions 1-3 had concluded by the time t4, the cumulative level of traffic would be adjusted accordingly. For example, if session 1 (initiated at time t1) concluded before time t4, the cumulative level of traffic (taking into account the fourth session) would be 2800 packets per second which would fall below the capacity threshold of 3000 packets per second for the tool port 282. Accordingly, the fourth session would be admitted for forwarding to the tool port 282.

The scenario depicted in Table 2 assumes a static capacity threshold for tool port 282. For example, as shown, the capacity threshold remains at 3000 packets per second at times t0-t4. However, in some embodiments, this capacity threshold may dynamically change over time. For example, the capacity threshold may dynamically increase or decrease due to factors such as the day of the week, time of day, measured conditions at the tool port 282, 284 or external tool 250, 252, type of traffic, user input, combination of sessions being handled, availability of backup tool ports, etc.

For example, in an embodiment, the capacity threshold of a particular tool port 282, 284 may dynamically increase during times that are historically prone to higher traffic levels to avoid unnecessarily denying admission to sessions. Conversely, in this example, the capacity threshold of a particular tool port 282, 284 may dynamically decrease at days and times historically prone to lower traffic levels to lower the risk of overloading at the tool 250, 252.

In another example, the capacity threshold of a particular tool port 282, 284 may dynamically increase in response to measured conditions at the particular tool port 282, 284 and/or external tool 250, 252 indicating lower than predicted actual traffic levels. While this may risk overloading the tool 250, 252, this measure may serve to maximize utilization at the tool 250, 252. Conversely, in this example, the capacity threshold of a particular tool port 282, 284 may dynamically decrease in response measured conditions at the particular tool port 282, 284 and/or external tool 250, 252 indicating higher than predicted actual traffic levels. Application of a more conservative capacity threshold may help alleviate the risk of overloading at the external tool 250, 252.

In another example, the capacity threshold of a particular tool port 282, 284 may dynamically increase in response to a decreased availability of other tool ports to handle forwarded traffic. This may reduce the rate of denying admission to new sessions. Conversely, in this example, the capacity threshold of a particular tool port 282, 284 may dynamically decrease in response to detecting increased availability at other tool ports. In other words, a more conservative capacity threshold may be applied to a particular tool port if other tool ports are available to pick up any slack.

As will be described, a user may optionally whitelist or otherwise prioritize certain traffic over the network for processing by a tool 250, 252. For example, an administrator of a network may want to prioritize the monitoring of traffic to and from certain entities (users, devices, addresses, applications, etc.). To ensure that such traffic is passed to a tool 250, 252 for monitoring the admission control process described above may not be applied. Consider the example scenario represented in Table 2. If a whitelisted session is initiated at time t5 that whitelisted session may be forwarded to the tool port 282 regardless of the predicted level of traffic for the session or what the cumulative level of traffic for the tool port 282.

Figure 5:
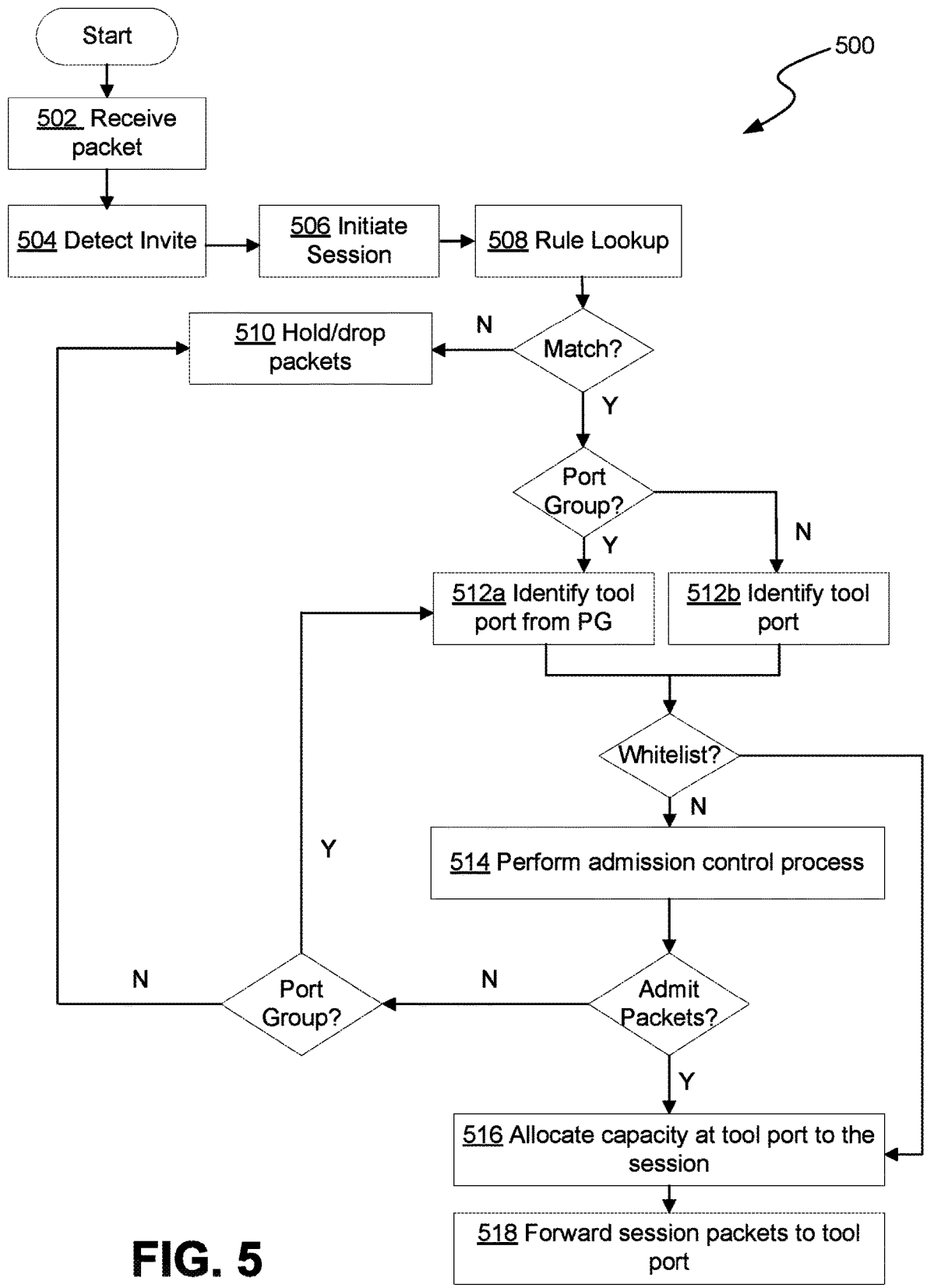
FIG. 5 shows a flow chart of an example process for handling sessions at a network visibility node that includes the tool port throttling process of FIG. 3.

FIG. 5 shows a flow chart of an example process 500 for handling sessions at a network visibility node, in accordance with some embodiments. For clarity, the example process 500 is described with respect to network visibility node 220 and associated components depicted in FIG. 2A, however this is not to be construed as limiting. The process may be applied by any type of processing device (physical or virtual) that includes a point of ingress communicatively coupled to a network and a point of egress communicatively coupled to an external tool. Further, one or more steps of the example process 500 may be performed by any one or more of the components of the example processing system described with respect to FIG. 7. For example, the process depicted in FIG. 5 may be represented in instructions stored in memory that are then executed by a processing unit. The process 500 described with respect to FIG. 5 is an example provided for illustrative purposes and is not to be construed as limiting. Other processes may include more or fewer steps than depicted while remaining within the scope of the present disclosure. Further, the steps depicted in example process 500 may be performed in a different order than is shown.

Example process 500 begins at step 502 with receiving a packet at an ingress port (e.g., a network port 222, 224) of a network visibility node 220, for example, as described with respect to step 302 in the flow chart of FIG. 3. As with step 302, the act of receiving the packet at step 502 may be performed by any of the ingress port (e.g., a network port 222, 224), the integrated circuit 240, the processing unit 242, the admission control module 260, the flow map module 270, or any other component (shown or not shown) of the network visibility node 220.

At step 504, the packet received at step 502 is identified as a session INVITE. This step may include processing, by the network visibility node 220, the received packet to identify information indicating that the packet is an INVITE. This may, in some embodiments, include reading header information and/or performing DPI.

At step 506 a session is created and logged in response to detecting the INVITE. For example, in some embodiments, information associated with the initiated session is added to a co-relation table that includes information regarding other current sessions. By accessing this co-relation table, the network visibility node can identify subsequently received packets as belonging to any one of the current sessions. Any other technique for determining which session a received packet is associated with may similarly be applied.

At step 508, a rule lookup process is performed to match the session to a map. In this context, a "map" may refer to a set of predefined or user defined rules for forwarding traffic received at a network visibility node 220 to one or more tools 250, 252, via one or more tool ports 282, 284. For example, as previously described, packets received at a network visibility node 220 may be forwarded to tool ports 282, 284 according to a one-to-one, one-to-many, many-to-one, or many-to-many transmission scheme. If a match is found, the rules of the map are used to identify the one or more tool ports 282, 284 to which the session packets are to be forwarded.

In some situations, the rules of the map may dictate that the packets be forwarded to a load balanced port group that includes a plurality of tool ports 282, 284. In such situations, a particular tool port from the load balanced port group is identified at step 512a. The particular tool port may be any of a first or primary tool port included in the port group, the tool port in the port group that has the most capacity (i.e., fewest previously allocated sessions), or may be a randomly selected tool port from the port group. Otherwise, the particular tool port is identified at step 512b based on the rules of the map.

In some situations, an initiated session may not match a rule in the map. For example, the network visibility node 220 and associated external tools 250, 252 may not be configured to process traffic similar to that of the session. If the initiated session does not match a rule in the map, subsequently received packets associated with the session may at step 510 be held in a collector for later processing or may otherwise be dropped.

Provided that one or more tool ports 282, 284 are identified for the session at steps 512a-b, the process continues at step 514 with performing admission control to determine whether to forward subsequently received packets associated with the session to the identified one or more tool ports 282, 284. For example, step 514 may involve calling the admission control module 260 to process the packet received at step 502. Again, in some embodiments, this admission decision may be based on whether a predicted level of traffic for the session satisfies a capacity criterion of the identified tool port 282, 284, for example, as described with respect to FIG. 3.

If, based on the processing at step 514, the session is admitted for forwarding to the identified tool port 282, 284, the process continues at step 516 with allocating capacity at the tool port 282, 284 to the session and at step 518 with forwarding any subsequently received packets associated with the session to the identified tool port, for example, as described with respect to FIG. 3.

As previously described, some sessions may be whitelisted. A given session's whitelist status may be determined, for example, at step 508 based on the rules in the map. As shows in FIG. 5, the admission control process of step 514 may not be performed for whitelisted sessions. Instead, for whitelisted sessions, step 514 is skipped and the example process 500 proceeds directly to steps 516 and 518.

If, based on the processing at step 514, the session is not admitted for forwarding to the identified tool port 282, 284 several different actions may be taken. If the session is mapped to a port group, the process 500 may return to step 512a to identify an alternative tool port from the port group to try. The admission control process of step 514 is then run again to determine whether to admit the session for forwarding to the alternative tool port. Alternatively, if the session is not admitted, subsequently received packets associated with the session may be held for later processing (if capacity at the tool port opens up) or simply dropped.

Example Deployment in a Network Environment

Figure 6:
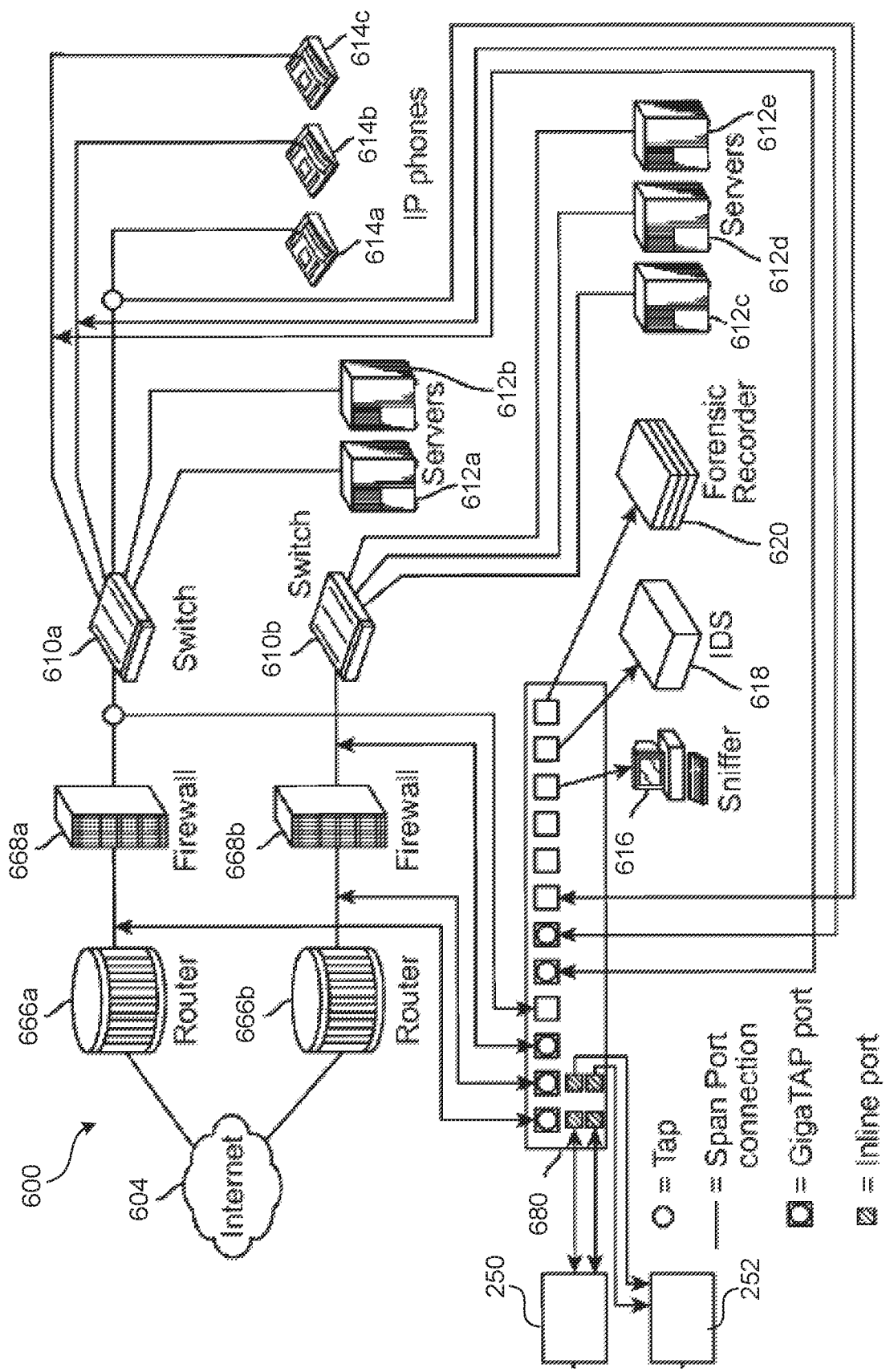
FIG. 6 shows an example deployment of a network switch appliance as a visibility node in a network environment.

FIG. 6 shows an example deployment of a network switch appliance 680 as a visibility node in a network environment 600. The network switch appliance 680 depicted in FIG. 6 may include the same or similar components as the network visibility node 220 described with respect to FIGS. 2A-2B. In the example network environment 600 depicted in FIG. 6, the Internet 604 is coupled via routers 666a-b and firewalls 668a-b to two switches 610a and 610b. Switch 610a is coupled to servers 612a-b and IP phones 614a-c. Switch 610b is coupled to servers 612c-e. A sniffer 616, an IDS 618 and a forensic recorder 620 (collectively, "non-pass through" or "out-of-band" tools) are coupled to the network switch appliance 680. As illustrated in FIG. 6, there is a reduction on the number of non-pass through tools in this deployment as compared to a conventional configuration (in which there may be one or more non-pass through tools between router 666a and firewall 668a, one or more non-pass through tools between firewall 668a and switch 610a, one or more non-pass through tools between router 666b and firewall 668b, and firewall 668b and switch 610b) because the same non-pass through tools can now access information anywhere in the network environment 600 through the appliance 680. The user has flexibility to channel whatever traffic to whatever tool or groups of non-pass through tools, using the any-to-any, any-to-many and many-to-one capability of the system in accordance with the different embodiments previously described. For example, all the conversations of the IP phones 614a-c can be easily configured to be sent to an IDS 618. It is also possible that traffic inside a particular IP phone 614a-c connection can be sent to a sniffer 616, and Intrusion Detection System 618 and a forensic recorder 620 simultaneously via the one-to-many function.

In some embodiments, when using the appliance 680, one or more non-pass through tools (such as IDS 618, sniffer 616, forensic recorder 620, etc.) may be connected to tool port(s), and one or more pass through tools 250, 252 (e.g., IPS) may be connected to other tool port(s) (e.g., in-line tool port(s)). Such a configuration allows non-pass through tool(s) and pass through tools(s) to simultaneously monitor the network traffic. Each non-pass through tool is in listening mode (i.e., it receives packets intended to be communicated between two nodes), and each pass through tool is in pass-thru mode (i.e., it receives packets intended to be communicated between two nodes, processes them, and then passes the packets downstream towards the intended recipient node). In some cases, by having both an IDS and an IPS connected to the appliance 680, the appliance 680 can compare whether the IDS or the IPS sees more threats, and/or can have a redundant protection such that if the IPS misses any threat, the IDS may pick it up.

Example Processing System

Figure 7:
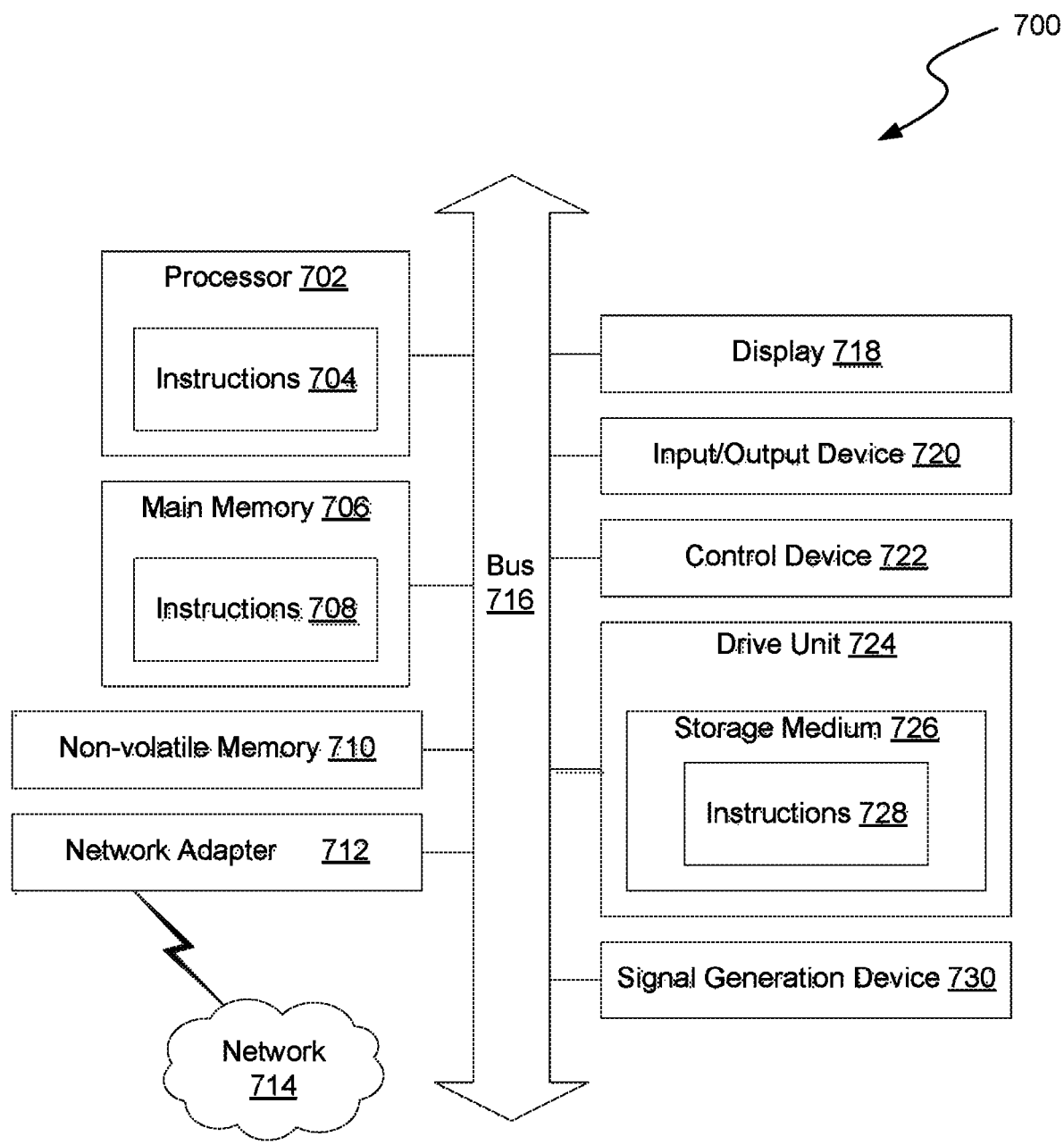
FIG. 7 shows a block diagram illustrating an example processing system.

FIG. 7 is a block diagram illustrating an example of a processing system 700 in which at least some operations described herein can be implemented. For example, at least a portion of the processing system 700 may be included in an network visibility node 220. The computing system may include one or more central processing units ("processors") 702, main memory 706, non-volatile memory 710, network adapter 712 (e.g., network interfaces), display 718, input/output devices 720, control device 722 (e.g., keyboard and pointing devices), drive unit 724 including a storage medium 726, and signal generation device 730 that are communicatively connected to a bus 716. The bus 716 is illustrated as an abstraction that represents any one or more separate physical buses, point to point connections, or both connected by appropriate bridges, adapters, or controllers. The bus 716, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In various embodiments, the processing system 700 operates as a standalone device, although the processing system 700 may be connected (e.g., wired or wirelessly) to other machines. For example, the processing system 700 may include a terminal that is coupled directly to a network appliance. As another example, the computing system 700 may be wirelessly coupled to the network appliance.

In various embodiments, the processing system 700 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the computing system.

While the main memory 706, non-volatile memory 710, and storage medium 726 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 728. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module, or sequence of instructions referred to as "computer programs." The computer programs typically comprise one or more instructions (e.g., instructions 704, 708, 728) set at various times in various memory and storage devices in a computer, and that, when read and executed by one or more processing units or processors 702, cause the processing system 700 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 710, floppy and other removable disks, hard disk drives, optical disks (e.g., Compact Disk Read-Only Memory (CD ROMS), Digital Versatile Disks (DVDs)), and transmission type media such as digital and analog communication links.

The network adapter 712 enables the processing system 700 to mediate data in a network 714 with an entity that is external to the processing system 700, such as a network appliance, through any known and/or convenient communications protocol supported by the processing system 700 and the external entity. The network adapter 712 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 712 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand.

Other network security functions can be performed or included in the functions of the firewall, including intrusion prevention, intrusion detection, next-generation firewall, personal firewall, etc.

As indicated above, the techniques introduced herein are implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above or to the extent that any such embodiments might be mutually exclusive in function and/or structure.

Although the present innovation has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A method comprising:
receiving a packet at an ingress port of a network visibility node;
processing, by the network visibility node, information included in the received packet to derive a predicted level of traffic for a traffic flow associated with the received packet based on a codec associated with the received packet, the predicted level of traffic including a predicted packet rate for the traffic flow;
forwarding, by the network visibility node, packets associated with the traffic flow to an egress port of the network visibility node when the predicted level of traffic satisfies a capacity criterion of the egress port that corresponds to a maximum predicted packet forwarding rate for the egress port, the egress port communicatively coupled to an external tool that is not an intended destination of the received packet, wherein the predicted level of traffic satisfies the capacity criterion if a sum of the predicted level of traffic for the traffic flow and a predicted level of traffic for all other traffic flows previously allocated to the egress port is at or below a capacity threshold of the egress port;
processing, by the network visibility node, the received packet to determine that the traffic flow associated with the received packet is a whitelisted traffic flow; and
forwarding, by the network visibility node, packets associated with the whitelisted traffic flow to the egress port even if the predicted level of traffic does not satisfy the capacity criterion of the egress port.

2. The method of claim 1, wherein the egress port is one of a plurality of egress ports in a load-balanced port group of the network visibility node.

3. The method of claim 1, wherein the predicted level of traffic for the traffic flow is further based on any of a traffic type, a transport protocol, an origin, or a destination of the traffic flow.

4. The method of claim 1, wherein the received packet is indicative of an initiated communications session, and wherein the traffic flow includes other received packets associated with the communications session.

5. The method of claim 1, further comprising:
detecting a session invitation in the received packet; and
initiating a communications session in response to detecting the session invitation;
wherein the traffic flow includes other received packets associated with the communications session.

6. The method of claim 1, wherein the capacity criterion is based on a portion of capacity of the egress port previously allocated to other traffic flows.

7. The method of claim 1, further comprising:
determining the codec associated with the received packet by inspecting a payload of the received packet for an identifier indicative of the relevant codec.

8. A network visibility node comprising:
a plurality of network ports through which to communicate over a computer network;
a plurality of tool ports through which to communicate with external tools; and
an admission control module configured to:
receive a packet at a particular network port of the plurality of network ports;
process information included in the received packet to derive a predicted a level of traffic for a traffic flow associated with the received packet based on a codec associated with the received packet, the predicted level of traffic including a predicted packet rate for the traffic flow;
forward received packets associated with the traffic flow to a particular tool port of the plurality of tool ports when the predicted level of traffic satisfies a capacity criterion of the particular tool port that corresponds to a maximum predicted packet forwarding rate for the particular tool port, the particular tool port communicatively coupled to an external tool that is not an intended destination of the received packet, wherein the predicted level of traffic satisfies the capacity criterion if a sum of the predicted level of traffic for the traffic flow and a predicted level of traffic for all other traffic flows previously allocated to the particular tool port is at or below a capacity threshold of the particular tool port;
process the received packet to determine that the traffic flow associated with the received packet is a whitelisted traffic flow; and
forward packets associated with the whitelisted traffic flow to the particular tool port even if the predicted level of traffic does not satisfy the capacity criterion of the particular tool port.

9. The network visibility node of claim 8, wherein the predicted level of traffic for the traffic flow is based any of a traffic type, a transport protocol, an origin, or a destination associated with the traffic flow.

10. The network visibility node of claim 8, further comprising:
a memory having stored thereon specifications for a plurality of codecs;
wherein processing the received packet to predict the level of traffic for the traffic flow associated with the received packet further includes;

accessing the memory to identify a specification for the codec associated with the traffic flow;

wherein the predicted level of traffic for the traffic flow is based on the accessed specification for the codec associated with the traffic flow.

11. The network visibility node of claim 8, wherein the predicted level of traffic for the traffic flow is maximum specified level of traffic for the codec.

12. The network visibility node of claim 8, further comprising:
a flow map module configured to identify, based on a forwarding rule, the particular tool port from the plurality of tool ports, for forwarding traffic associated with the traffic flow.

13. An apparatus comprising:
a plurality of network ports through which to communicate over a computer network;
a plurality of tool ports through which to communicate with external tools;
a processor; and
a memory having instructions stored thereon, which when executed by the processor, cause the apparatus to:
receive a packet at a particular network port of the plurality of network ports;
associate the received packet with a particular communications session;
identify, based on a forwarding rule, a particular tool port of the plurality of tool ports, for forwarding traffic associated with the particular communications session;
derive a predicted level of traffic of the particular communications session based on information included in the received packet associated with the particular communications session, including information indicative of a codec associated with the received packet, the predicted level of traffic including a predicted packet rate for the particular communications session;
determine a cumulative level of traffic at the particular tool port based on the predicted level of traffic of the particular communications session; and
forward received packets associated with the particular communications session to the particular tool port when the cumulative level of traffic satisfies a capacity criterion of the particular tool port that corresponds to a maximum predicted packet forwarding rate for the particular tool port, wherein the cumulative level of traffic at the particular tool port is a sum of the predicted level of traffic of the particular communications session and predicted levels of traffic for all other communications sessions previously allocated to the particular tool port;
determine that the particular communications sessions is whitelisted; and
forward received packets associated with the particular communications session to the particular tool port even if the cumulative level of traffic does not satisfy the capacity criterion of the particular tool port, in response to determining that the particular communications sessions is whitelisted.

14. The apparatus of claim 13, wherein the characteristic of the particular communications session is any of a traffic type, a transport protocol, an origin, or a destination.

15. The apparatus of claim 13, wherein identifying the particular tool port includes:
identifying, based on the forwarding rule, a load-balanced port group for forwarding traffic associated with the particular communications session;
wherein the particular tool port is one of a plurality of ports in the load-balanced port group.

* * * * *